United States Patent
Geiger et al.

(10) Patent No.: US 10,752,341 B2
(45) Date of Patent: Aug. 25, 2020

(54) TIP CLEARANCE HARMONIC ESTIMATION

(71) Applicant: SIKORSKY AIRCRAFT CORPORATION, Stratford, CT (US)

(72) Inventors: Derek Geiger, Wilton, CT (US); Jeremy Frimpong Banning, New York, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 514 days.

(21) Appl. No.: 15/552,622

(22) PCT Filed: Dec. 21, 2015

(86) PCT No.: PCT/US2015/067025
§ 371 (c)(1),
(2) Date: Aug. 22, 2017

(87) PCT Pub. No.: WO2016/137566
PCT Pub. Date: Sep. 1, 2016

(65) Prior Publication Data
US 2018/0050795 A1 Feb. 22, 2018

Related U.S. Application Data

(60) Provisional application No. 62/119,659, filed on Feb. 23, 2015.

(51) Int. Cl.
*B64C 27/00* (2006.01)
*B64C 27/57* (2006.01)
*B64C 27/10* (2006.01)
*B64C 27/58* (2006.01)

(52) U.S. Cl.
CPC ......... *B64C 27/008* (2013.01); *B64C 27/006* (2013.01); *B64C 27/10* (2013.01); *B64C 27/57* (2013.01); *B64C 27/58* (2013.01)

(58) Field of Classification Search
CPC ..... B64C 27/006; B64C 27/008; B64C 27/10; B64C 27/57; B64C 27/58
USPC .............. 702/42, 94, 149, 158, 97; 73/1.79; 244/17.13; 415/1
See application file for complete search history.

(56) References Cited

U.S. PATENT DOCUMENTS

| | | | |
|---|---|---|---|
| 7,180,305 B2 | 2/2007 | Andarawis et al. | |
| 7,455,495 B2 | 11/2008 | Leogrande et al. | |
| 7,468,856 B2 | 12/2008 | Fitzpatrick et al. | |
| 10,364,696 B2 * | 7/2019 | Virkler | F01D 25/24 |
| 2015/0016949 A1 | 1/2015 | Smith | |
| 2015/0028152 A1 | 1/2015 | Eller et al. | |

OTHER PUBLICATIONS

PCT/US2015/067025—ISR/WO Issued Feb. 23, 2016, 12 pages.

* cited by examiner

*Primary Examiner* — John H Le
(74) *Attorney, Agent, or Firm* — Cantor Colburn LLP

(57) ABSTRACT

A method of tip clearance estimation for a rotor blade is provided. The method includes measuring blade deflection of the rotor blade, generating a harmonic function for the rotor blade from the measured blade deflection, predicting tip displacement of the rotor blade using the generated harmonic function and adjusting a position of the rotor blade according to the predicted tip displacement.

15 Claims, 5 Drawing Sheets

TIP CLEARANCE HARMONIC ESTIMATION

CROSS REFERENCE TO RELATED APPLICATIONS

This application is a National Stage application of PCT/US2015/067025, filed Dec. 21, 2015, which claims the benefit of U. S. Provisional Application No. 62/119,659, filed Feb. 23, 2015, both of which are incorporated by reference in their entirety herein.

STATEMENT REGARDING FEDERALLY SPONSORED RESEARCH OR DEVELOPMENT

This invention was made with Government support under Agreement No. W911W6-13-2-0003 awarded by the Army. The Government has certain rights in the invention.

BACKGROUND OF THE INVENTION

The subject matter disclosed herein relates to a harmonic estimator and, more particularly, to a harmonic estimator for tip clearance in a rotorcraft.

A coaxial rotorcraft is characterized as having an airframe and a main rotor assembly at a top portion of the airframe. The main rotor assembly includes upper and lower main rotors that rotate about a common rotational axis relative to the airframe in opposite directions to generate lift and thrust for the aircraft. Tip clearance between the respective blades of the upper and lower rotors refers to the distance between the blades of the upper rotor and the blades of the lower rotor as they pass one another during the rotations at blade crossings. Generally, tip clearance needs to be maintained above a pre-defined lower limit to insure that the blades of the upper and lower rotors do not hit one another.

In order to insure that tip clearance is maintained above this lower limit, the tip clearance is typically monitored using direct sensing methods such as proximity sensors. However, since these direct measurements only measure the tip clearance at blade crossings, the direct measurements do not necessarily have predictive capability. Also, since proximity sensors only provide tip clearance measurements, they cannot be used to gather additional state information.

BRIEF DESCRIPTION OF THE INVENTION

According to one aspect of the invention, a method of tip clearance estimation for a rotor blade is provided. The method includes measuring blade deflection of the rotor blade, generating a harmonic function for the rotor blade from the measured blade deflection, predicting tip displacement of the rotor blade using the generated harmonic function and adjusting a position of the rotor blade according to the predicted tip displacement.

In accordance with additional or alternative embodiments, the measuring of the blade deflection includes sensing strain in the rotor blade, determining blade deflection for the rotor blade in accordance with the sensing and calculating tip displacement for the rotor blade in accordance with the determined blade deflection.

In accordance with additional or alternative embodiments, the sensing includes taking internal strain readings from within the rotor blade from the strain gage installed in or on the rotor blade.

In accordance with additional or alternative embodiments, the strain gage is installed proximate to a rotor hub to which the rotor blade is connected.

In accordance with additional or alternative embodiments, the determining of the blade deflection comprises analyzing pre-defined strain-deflection relationships using the internal strain readings.

According to additional or alternative embodiments, a rotorcraft is provided and includes an airframe, coaxial rotors disposed to rotate relative to the airframe in opposite directions about a common rotational axis to generate aircraft lift and thrust, sensors disposed in or on respective rotor blades of the coaxial rotors to sense strain therein and a tip clearance estimation unit configured to execute the method of tip clearance estimation in accordance with the sensed strain and to predict a minimum tip clearance between the respective rotor blades of the coaxial rotors per blade revolutions at various sampling steps in accordance with the predicted tip displacement of each of the respective rotor blades.

In accordance with additional or alternative embodiments, the rotorcraft further includes a flight computer configured to employ an output of the tip clearance estimation unit in a feedback loop for executing fly-by-wire controls.

In accordance with additional or alternative embodiments, the measuring of the blade deflection includes measuring a respective blade deflection of upper and lower rotor blades, the generating of the harmonic function includes generating a respective harmonic function for the upper and lower rotor blades from the measured blade deflections, the predicting of the tip displacement includes predicting a respective tip displacement of the upper and lower rotor blades and the adjusting of the position includes adjusting respective positions of the upper and lower rotor blades according to the predicted tip displacements.

In accordance with additional or alternative embodiments, the measuring of the respective blade deflections includes sensing strain in the upper and lower rotor blades, determining the respective blade deflections for the upper and lower rotor blade in accordance with the sensing and calculating respective tip displacements for the upper and lower rotor blades in accordance with the determined blade deflections.

In accordance with additional or alternative embodiments, the sensing includes taking internal strain readings from within the upper and lower rotor blades from strain gages installed in or on the upper and lower rotor blades.

In accordance with additional or alternative embodiments, the strain gages are installed proximate to a rotor hub to which the upper and lower rotor blades are connected.

In accordance with additional or alternative embodiments, the determining of the respective blade deflections includes analyzing pre-defined strain-deflection relationships using the internal strain readings.

According to additional or alternative embodiments, a rotorcraft is provided and includes an airframe, coaxial rotors disposed to rotate relative to the airframe in opposite directions about a common rotational axis to generate aircraft lift and thrust, sensors disposed in or on respective rotor blades of the coaxial rotors to sense strain therein and a tip clearance estimation unit configured to execute the methods described herein in accordance with the sensed strain.

In accordance with additional or alternative embodiments, the rotorcraft further includes a flight computer configured to employ an output of the tip clearance estimation unit in a feedback loop for executing fly-by-wire controls.

In accordance with additional or alternative embodiments, the tip clearance estimation unit is a component of the flight computer.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, tip clearance of a coaxial rotorcraft is indirectly measured from readings indicative of blade deflection using a harmonic estimator. That is, the blade deflection of each rotor blade is measured using a strain-displacement method for example and a harmonic estimator is used to determine the harmonic components from the results of the strain-displacement method. With the harmonic components so determined, blade travel data as a function of azimuth can be predicted for both upper and lower rotors and thus a minimum tip clearance per revolution can be determined and maintained at every sample step independent of blade crossings.

Figure 1:
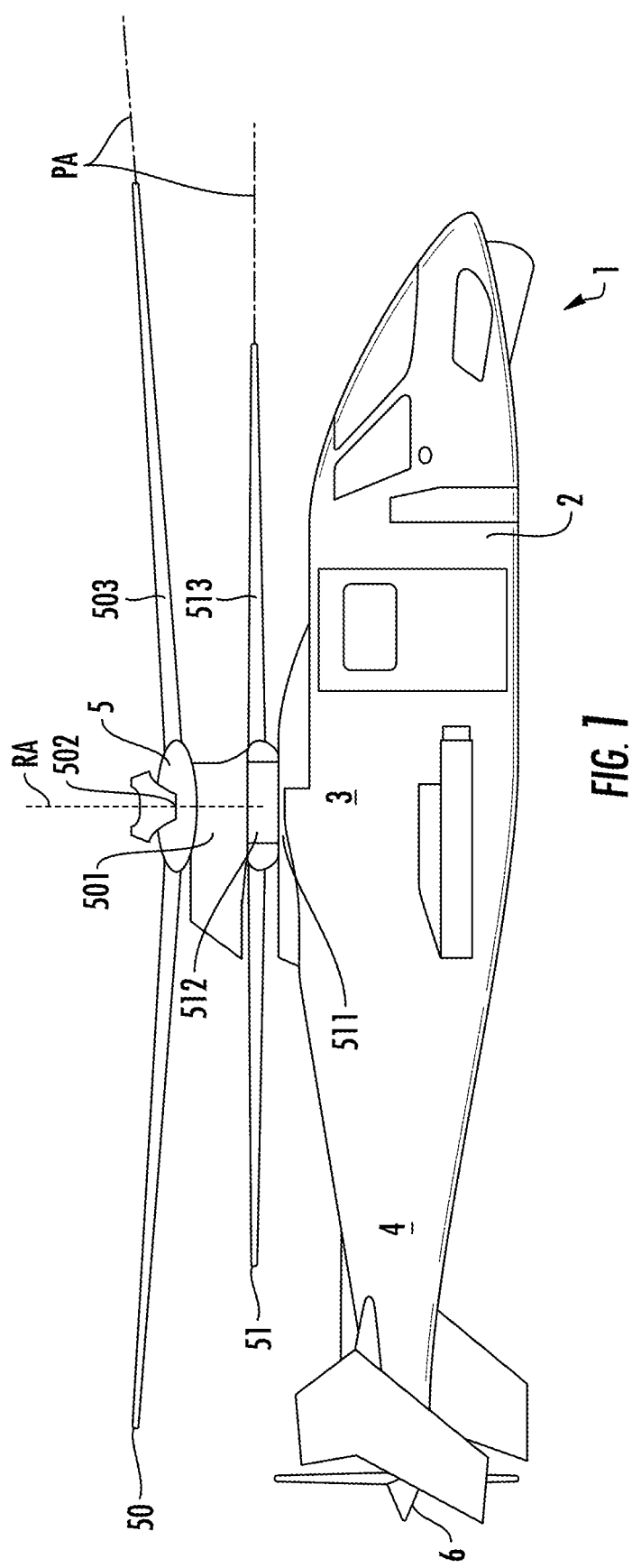
FIG. 1 is a side view of a coaxial, counter-rotating rotorcraft.
Figure 2:
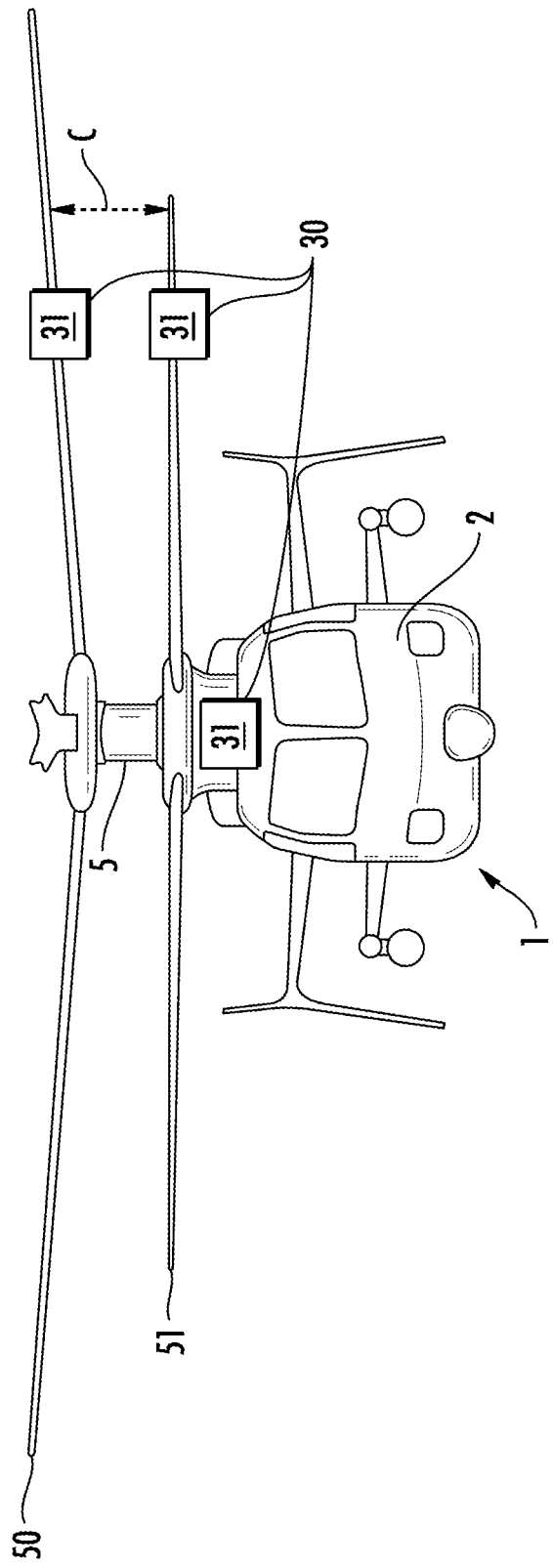
FIG. 2 is a front, elevation view of the rotorcraft of FIG. 1.
Figure 3:
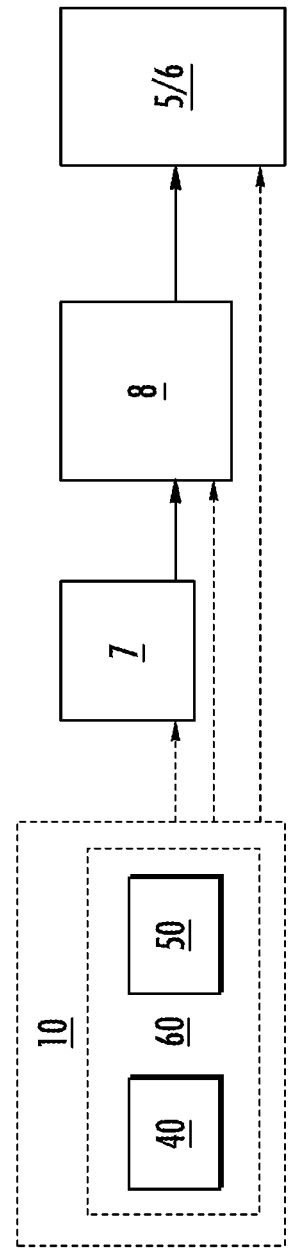
FIG. 3 is a schematic diagram of components of the rotorcraft of FIG. 1.

With reference to FIGS. 1-3, a coaxial rotorcraft 1 is provided and may be configured for example as a coaxial, counter-rotating helicopter or some other fixed or variable wing aircraft with single or multiple rotors. The rotorcraft 1 has an airframe 2 that is sized to accommodate a pilot and, in some cases, one or more crewmen and/or passengers as well as control features and a flight computer 10 (see FIG. 3). The airframe 2 has a top portion 3 and a tail portion 4 that extends in the aft direction. The rotorcraft 1 further includes a main rotor assembly 5 at the top portion 3 of the airframe 2, an auxiliary propulsor 6 at the tail portion 4, an engine 7 (see FIG. 3) and a transmission 8 (see FIG. 3). The engine 7 may be disposed within or on the airframe 2 and is configured to generate power to drive respective rotations of the main rotor assembly 5 and the auxiliary propulsor 6. The transmission 8 is similarly disposed within or on the airframe 2 and is configured to transmit the power from the engine 7 to the main rotor assembly 5 and the auxiliary propulsor 6.

The main rotor assembly 5 includes a first or upper rotor 50 and a second or lower rotor 51. The upper rotor 50 includes a rotor shaft 501, a hub 502 and blades 503 extending radially outwardly from the hub 502. The rotor shaft 501 and the hub 502 are rotatable in a first direction about rotational axis RA, which is defined through the airframe 2, to drive rotations of the blades 503 about the rotational axis RA in the first direction. The lower rotor 51 includes a rotor shaft 511, a hub 512 and blades 513 extending radially outwardly from the hub 512. The rotor shaft 511 and the hub 512 are rotatable in a second direction about the rotational axis RA, which is opposite the first direction, to drive rotations of the blades 513 about the rotational axis RA in the second direction. The auxiliary propulsor 6 has a similar structure with an axis of rotation that is generally aligned with a longitudinal axis of the tail portion 4.

In extending radially outwardly from the hubs 502, 512, the blades 503, 513 are pivotable about respective pitch axes PA that run along respective longitudinal lengths of the blades 503, 513. This pitching can include lateral cyclic pitching, longitudinal cyclic pitching and collective pitching. Lateral cyclic pitching varies blade pitch with left and right movements and tends to tilt the rotor disks formed by the blades 503 and 513 to the left and right to induce roll movements. Longitudinal cyclic pitching varies blade pitch with fore and aft movements and tends to tilt the rotor disks forward and back to induce pitch nose up or down movements. Collective pitching refers to collective angle of attack control for the blades 503, 513 to increase/decrease torque.

When driven to rotate by the engine 7 via the transmission 8, the main rotor assembly 5 generates lift and the auxiliary propulsor 6 generates thrust. The pilot (and crew) and the flight computer 10 can cyclically and collectively control the pitching of the blades 503, 513 of at least the main rotor assembly 5 in order to control the flight and navigation of the rotorcraft 1 in accordance with pilot/crew inputted commands and current flight conditions. In doing so, the blades 503, 513 may be monitored to insure that blade tip clearance C (see FIG. 2) is maintained above a predefined minimum distance so that the respective tips of the blades 503 do not impact the respective tips of the blades 513.

The rotorcraft 1 may further include a system of sensors 30. The system of sensors 30 may in turn include a plurality of individual sensors 31 that are respectively disposed on rotating or non-rotating frames of the rotorcraft 1. That is, the sensors 31 can be disposed on the hubs 502, 512, the blades 503, 513 or on the airframe 2. In any case, the sensors 31 can sense or obtain data used to detect hub moments for the upper rotor 50 and the lower rotor 51, blade tip clearances between the blades 503 of the upper rotor 50 and the blades 513 of the lower rotor 51, a differential lateral cyclic pitch between the blades 503 of the upper rotor 50 and the blades 513 of the lower rotor 51, a differential longitudinal pitch between the blades 503 of the upper rotor 50 and the blades 513 of the lower rotor 51, a pitch rate of the rotorcraft 1 and an attitude of the rotorcraft 1. Based on such sensing capability, the sensors 31 are further configured to generate the hub moment data, the tip clearance data and the lift offset (lateral and longitudinal) data and to issue the same to flight computer 10.

Figure 4:
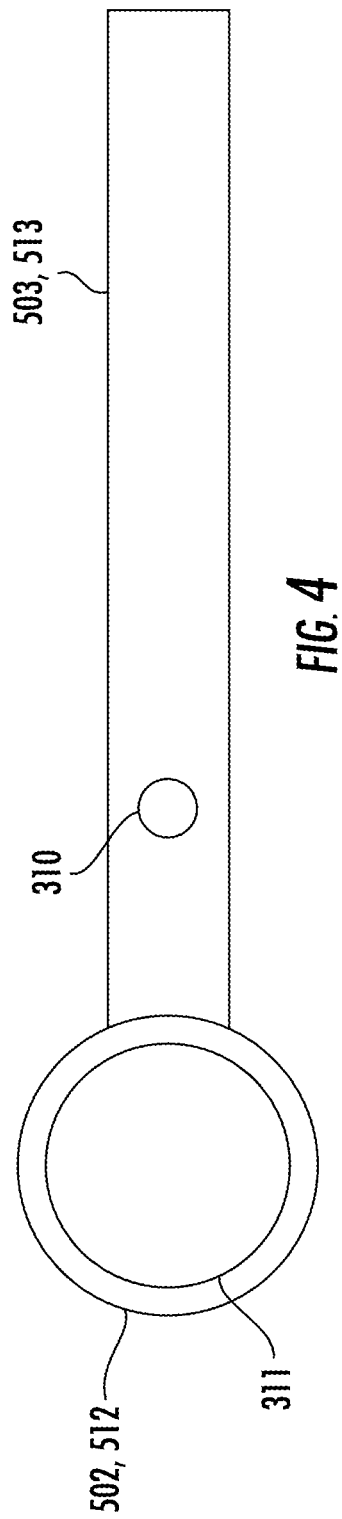
FIG. 4 is an enlarged schematic view of a strain gage of the rotorcraft in accordance with embodiments.
Figure 5:
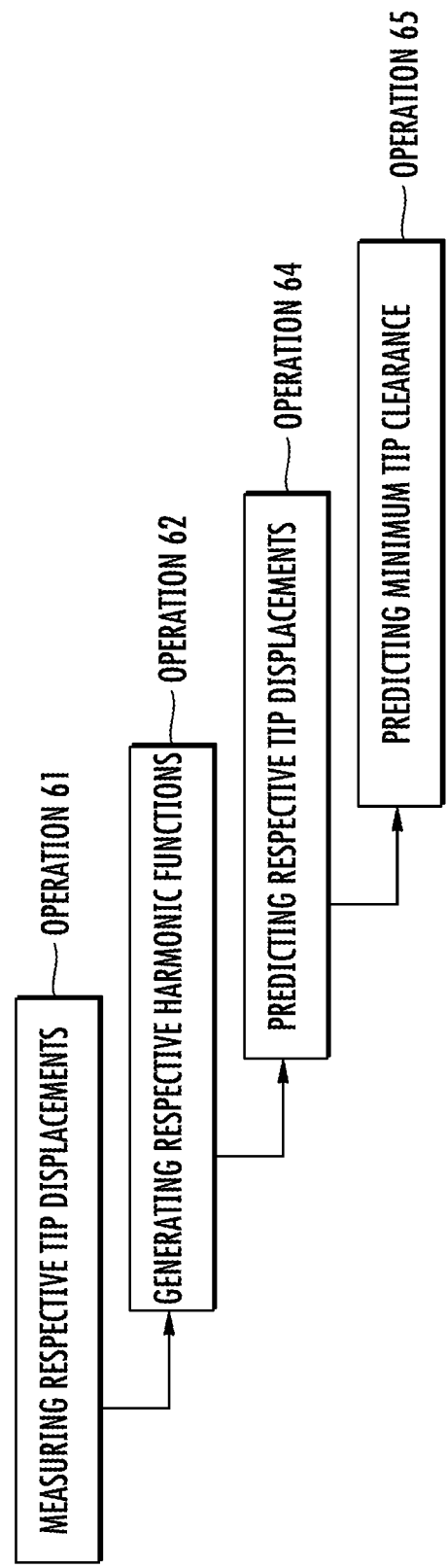
FIG. 5 is a flow diagram illustrating a method of tip clearance estimation in accordance with embodiments.
Figure 6:
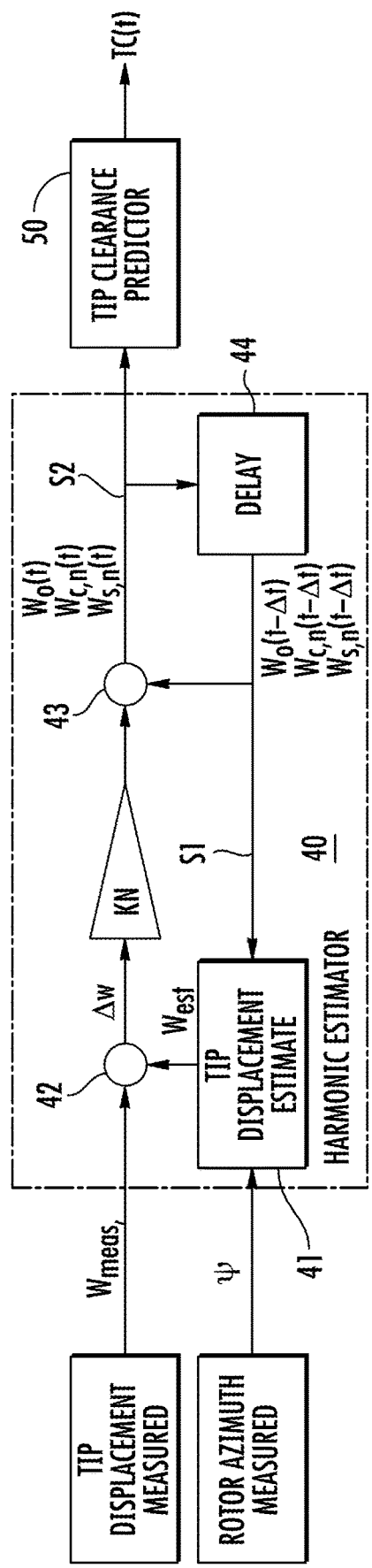
FIG. 6 is a schematic diagram of a harmonic estimator and a tip clearance predictor in accordance with embodiments.
Figure 7:
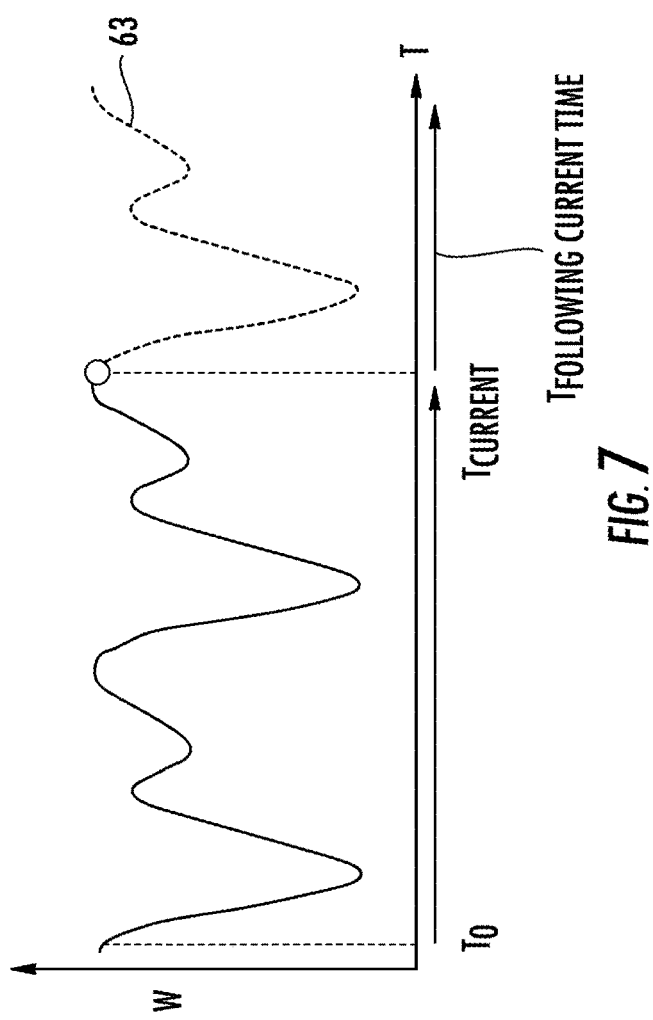
FIG. 7 is a graphical depiction of a harmonic function of a rotor blade.

In addition and, with continued reference to FIG. 3 and additional reference to FIGS. 4-9, the sensors 31 may be disposed to measure rotor azimuth for the first and second rotors 50 and 51 and at least one or more may be provided as strain gage sensors 310 that are disposed on the blades 503, 513 to be disposed or configured to sense strain occurring in the blades 503, 513. Such strain would be associated with blade deflection of the corresponding blade 503, 513 and can be used to determine the blade deflection and a tip displacement of the corresponding blade 503, 513. From the determination of the tip displacement, a harmonic function can be derived using a measurement of rotor azimuth and this harmonic function can be used to generate a tip clearance prediction. The tip clearance prediction can then be used to identify a minimum estimate tip clearance at blade crossings. As such, while the sensors 31 can be used to directly measure tip clearance, it is understood that the strain gage sensors 310 can be used to estimate and predict tip clearance in addition to or instead of direct measurement at each crossing of the blades 503, 513. With reference to FIG. 4, the strain gage sensors 310 are strain gages that are disposed in or on the blades 503, 513. As shown in FIG. 4, the strain gage sensors 310 may be disposed proximate to hubs 502, 512 and can be laid-up as part of the blades 503, 513 or inserted into a groove formed in the bodies of the blades 503, 513. In any case, the strain gage sensors 310 serve to measure strain or to take strain readings internally of the blades 503, 513 and are coupled to the flight computer 10, which may include a harmonic estimator 40 and a tip clearance predictor 50 to be described below. In accordance with embodiments, where signals output from the strain gage sensors 310 pass from rotating to non-rotating frames of the rotorcraft 1, such signals may be transmitted wirelessly or via a slip-ring 311.

As shown in FIGS. 3 and 5-8 and, in accordance with embodiments, the flight computer 10 may include the harmonic estimator 40 and the tip clearance predictor 50 although it is to be understood that the harmonic estimator 40 and the tip clearance predictor 50 can both be provided as stand-alone components as well. In any case, the harmonic estimator 40 and the tip clearance predictor 50 together form a tip clearance estimation unit 60 (see FIG. 3) that is configured to execute a method of tip clearance estimation for the blades 503, 513. The method includes an operation 61 of measuring respective tip displacements of the blades 503, 513 from an initial time $t_0$ to a current time $t_{current}$ (see FIG. 7), an operation 62 of generating respective harmonic functions 63 for the blades 503, 513 from the measured tip displacements, an operation 64 of predicting respective tip displacements of the blades 503, 513 for times following the current time (see FIG. 7) and an operation 65 of predicting a minimum tip clearance 66 between the blades 503, 513 per blade revolution at various sampling steps in accordance with the predicted respective tip displacements.

In accordance with embodiments, the measuring of operation 61 may include sensing strain in the blades 503, 513 by, e.g., the strain gages 310, determining respective blade deflections for the blades 503, 513 in accordance with the sensing by analyzing pre-defined strain-deflection relationships that are stored within, e.g., the flight computer 10 and calculating respective tip displacements for the blades 503, 513 in accordance with the determining.

In order to execute the method described above and, as shown in FIGS. 6-8, the harmonic estimator 40 may in accordance with some embodiments include a tip displacement estimate unit 41, a first summation unit 42, a second summation unit 43 and a delay buffer 44. The tip displacement unit 41 is receptive of at least the rotor azimuth measurement from the sensors 31 and a first signal 51 from the delay buffer 44. The first signal 51 incorporates a collective deflection term as a function of delayed time, a sine component of blade deflection as a function of delayed time and a cosine component of blade deflection as a function of delayed time. The tip displacement unit 41 is thus configured to generate and output a tip displacement estimate $w_{est}$. The first summation unit 42 is receptive of the tip displacement estimate $w_{est}$ and a tip displacement measurement $w_{meas}$ (see FIG. 5) based on the strain and blade deflection sensing of the strain gages 310 that are disposed on the blades 503, 513, as described above, from the initial time $t_0$ to the current time $t_{current}$. The first summation unit 42 thus generates and outputs a tip displacement error signal $\Delta w$ toward an amplifier having a gain Kn. The second summation unit 43 is receptive of the amplified error signal $\Delta w$ and the first signal 51.

The second summation unit 43 then generates a second signal S2, which is reflective of a harmonic function of the corresponding blades 503, 513 and incorporates a collective deflection term as a function of time, a sine component of blade deflection as a function of time and a cosine component of blade deflection as a function of time. This second signal S2 is output from the second summation unit 43 toward the tip clearance predictor 50 and the delay buffer 44. The delay buffer 44 is thus receptive of the second signal S2 and generates, from the second signal S2, a next first signal 51 which includes the collective deflection term as a function of delayed time, the sine component of blade deflection as a function of delayed time and the cosine component of blade deflection as a function of delayed time.

Having received the second signal S2, the tip clearance predictor 50 first calculates blade deflection $w(t, \Psi)$ as a function of time, including times following the current time $t_{current}$, and rotor azimuth per blade revolution according to the following harmonic function equation:

$$w(t, \Psi) = w_0(t) + \sum_{i=1}^{n} (w_{c,n}(t)\cos(n(\Psi + \Phi)) + w_{s,n}(t)\sin(n(\Psi + \Phi)))$$

where:
$w_0(t)$ is the collective blade deflection term as a function of time,
$w_{s,n}(t)$ is the sine component of blade deflection as a function of time,
$w_{c,n}(t)$ is the cosine component of blade deflection as a function of time,
$\Psi$ is the rotor azimuth, and
$\Phi$ is a constant offset to account for shifts in rotor crossings.

Next, the tip clearance predictor 50 calculates a minimum estimated tip clearance as a function of time, including times following the current time $t_{current}$, according to the following equation:

$$TC(t) = \min_{0° \leq \Psi \leq 360} \{(w_{LR}(t, \Psi_{LR})\cos(\Phi_{LR}) - w_{UR}(t, \Psi_{UR})\cos(\Phi_{UR})) + \Delta zhubs + \Delta zconing\}$$

where:
UR is the first rotor 50,
LR is the second rotor 51,
$\Delta zhubs$ is the distance between the first and second rotors 50 and 51 at the hubs 502, 512, and
$\Delta zconing$ is the distance between the first and second rotors 50 and 51 due to rotor blade coning.

Figure 8:
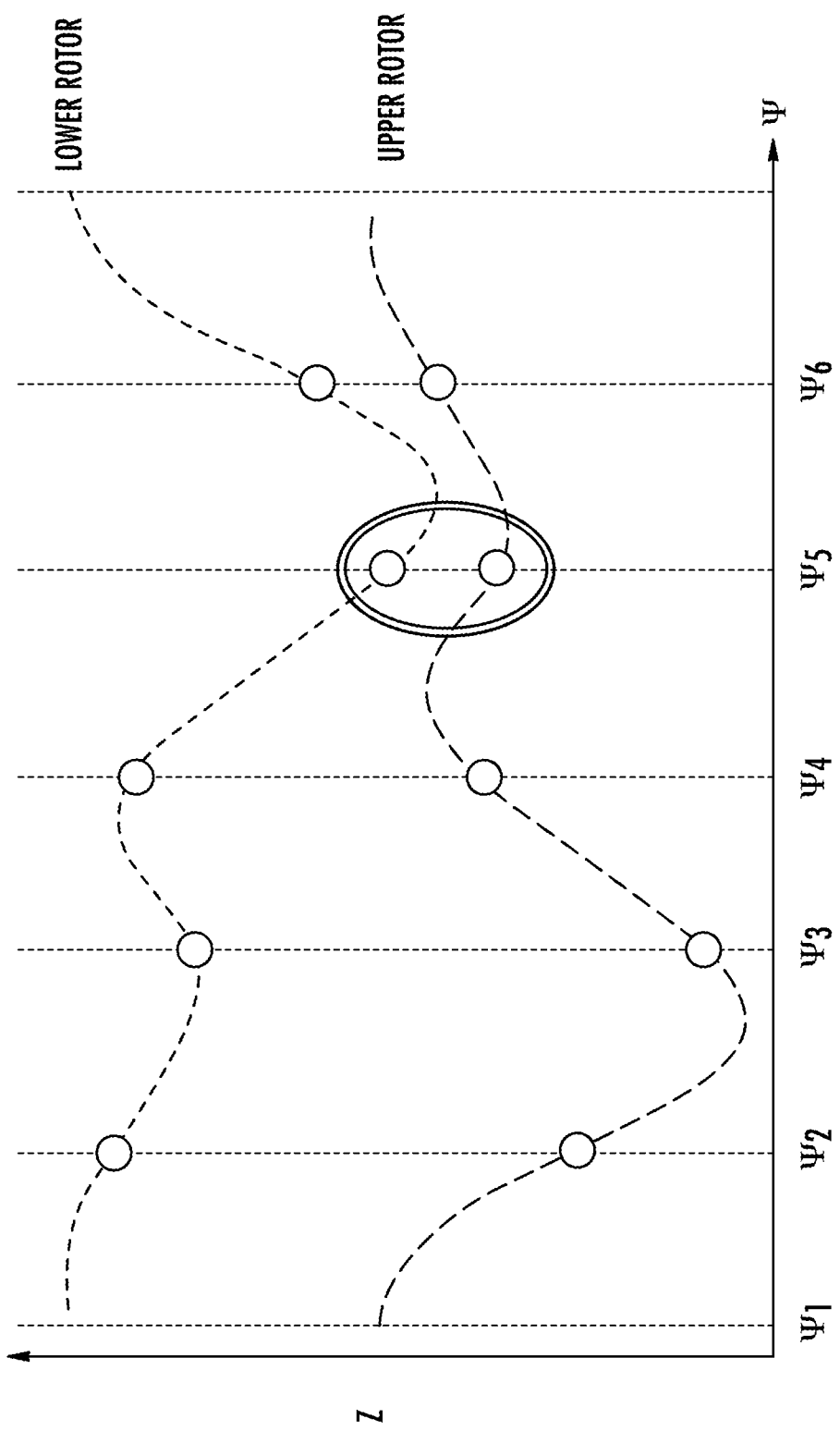
FIG. 8 is a graphical illustration of how harmonic functions of rotor blades can be used to predict tip clearances in accordance with embodiments.

As shown in FIG. 8, the minimum estimated tip clearance is circled as calculated by the tip clearance predictor 50 and can be used to predict the distance z between the blades 503, 513 as a function of rotor azimuth $\Psi$. As shown, the tip clearance predictor 50 predicts that the smallest value of z will occur at the blade crossings associated with rotor azimuth $\Psi_5$.

In accordance with further embodiments, the information and predictions provided by the tip clearance predictor 50 can be transmitted to the flight computer 10. The flight computer 10 can then employ the information and predictions of the tip clearance estimation unit 50 in a feedback loop for executing fly-by-wire controls of the rotorcraft 1.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in relation to predicting blade tip clearance in the context of a coaxial helicopter, aspects could be used to predict blade tip motions for a conventional single rotor helicopter. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of tip clearance estimation for a rotor blade, the method comprising:
    receiving signals from a sensor mounted to the rotor blade at a harmonic estimator;
    measuring a tip displacement of the rotor blade in a tip displacement unit of the harmonic estimator based on the signals from the sensor;
    generating and outputting a tip displacement estimate as a function of delayed time, a sine component of blade displacement as a function of delayed time and a cosine component as a function of delayed time in the tip displacement unit;
    generating a tip displacement error signal based on the measured tip displacement and the tip displacement estimate;
    generating a harmonic function for the rotor blade from the tip displacement error signal;
    predicting tip displacement of the rotor blade using the generated harmonic function;
    sending the predicted tip displacement to a flight computer; and
    adjusting a position of the rotor blade from the flight computer according to the predicted tip displacement.

2. The method according to claim 1, wherein the measuring of the blade deflection comprises:
    sensing strain in the rotor blade based on the signals from the sensor;
    determining blade deflection for the rotor blade in accordance with the sensing; and
    calculating tip displacement for the rotor blade in accordance with the determined blade deflection.

3. The method according to claim 2, wherein the sensing comprises taking internal strain readings from within the rotor blade from a strain gage installed in or on the rotor blade.

4. The method according to claim 3, wherein the strain gage is installed proximate to a rotor hub to which the rotor blade is connected.

5. The method according to claim 3, wherein the determining of the blade deflection comprises analyzing predefined strain-deflection relationships using the internal strain readings.

6. A rotorcraft, comprising:
    an airframe;
    coaxial rotors disposed to rotate relative to the airframe in opposite directions about a common rotational axis to generate aircraft lift and thrust;
    sensors disposed in or on respective rotor blades of the coaxial rotors to sense strain therein;
    a tip clearance estimation unit configured to execute the method according to claim 1 in accordance with the sensed strain and to predict a minimum tip clearance between the respective rotor blades of the coaxial rotors per blade revolutions at various sampling steps in accordance with the predicted tip displacement of each of the respective rotor blades.

7. The rotorcraft according to claim 6, wherein the flight computer is configured to employ an output of the tip clearance estimation unit in a feedback loop for executing fly-by-wire controls.

8. The method according to claim 1, wherein the measuring of the blade deflection comprises measuring a respective blade deflection of upper and lower rotor blades, the generating of the harmonic function comprises generating a respective harmonic function for the upper and lower rotor blades from the measured blade deflections, the predicting of the tip displacement comprises predicting a respective tip displacement of the upper and lower rotor blades and the adjusting of the position comprises adjusting respective positions of the upper and lower rotor blades according to the predicted tip displacements.

9. The method according to claim 8, wherein the measuring of the respective blade deflections comprises:
    sensing strain in the upper and lower rotor blades;
    determining the respective blade deflections for the upper and lower rotor blade in accordance with the sensing; and
    calculating respective tip displacements for the upper and lower rotor blades in accordance with the determined blade deflections.

10. The method according to claim 9, wherein the sensing comprises taking internal strain readings from within the upper and lower rotor blades from strain gages installed in or on the upper and lower rotor blades.

11. The method according to claim 10, wherein the strain gages are installed proximate to a rotor hub to which the upper and lower rotor blades are connected.

12. The method according to claim 10, wherein the determining of the respective blade deflections comprises analyzing pre-defined strain-deflection relationships using the internal strain readings.

13. A rotorcraft, comprising:
    an airframe;
    coaxial rotors disposed to rotate relative to the airframe in opposite directions about a common rotational axis to generate aircraft lift and thrust;
    sensors disposed in or on respective rotor blades of the coaxial rotors to sense strain therein;
    a tip clearance estimation unit configured to execute the method according to claim 8 in accordance with the sensed strain.

14. The rotorcraft according to claim 13, wherein the rotorcraft further comprises a flight computer configured to employ an output of the tip clearance estimation unit in a feedback loop for executing fly-by-wire controls.

15. The rotorcraft according to claim 14, wherein the tip clearance estimation unit is a component of the flight computer.

\* \* \* \* \*